H. W. HACKER.
MEASURING INSTRUMENT.
APPLICATION FILED JUNE 20, 1918.
1,307,776.
Patented June 24, 1919.
3 SHEETS—SHEET 2.
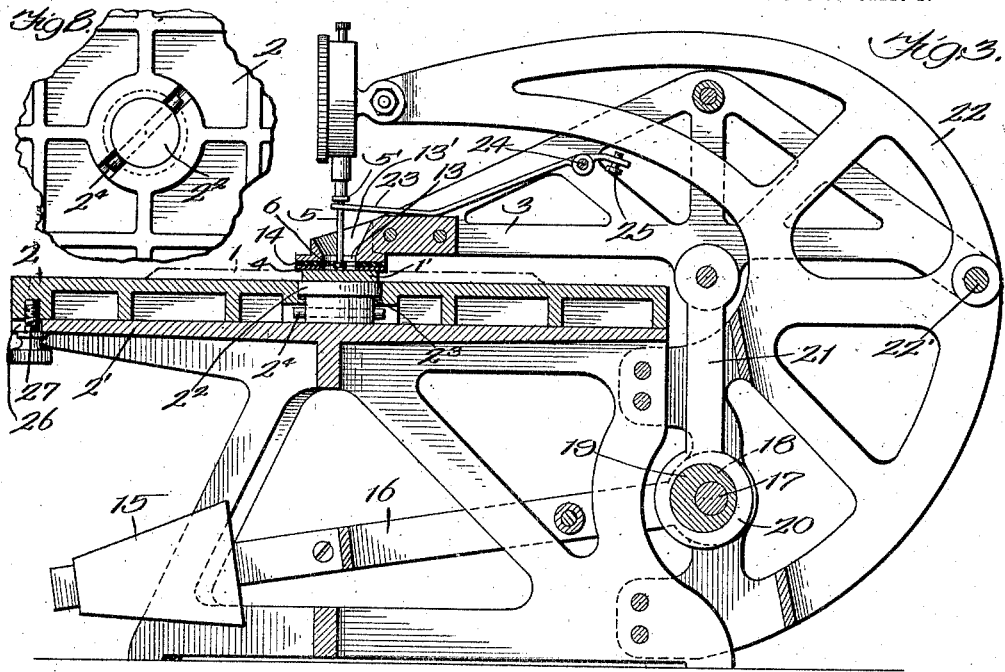
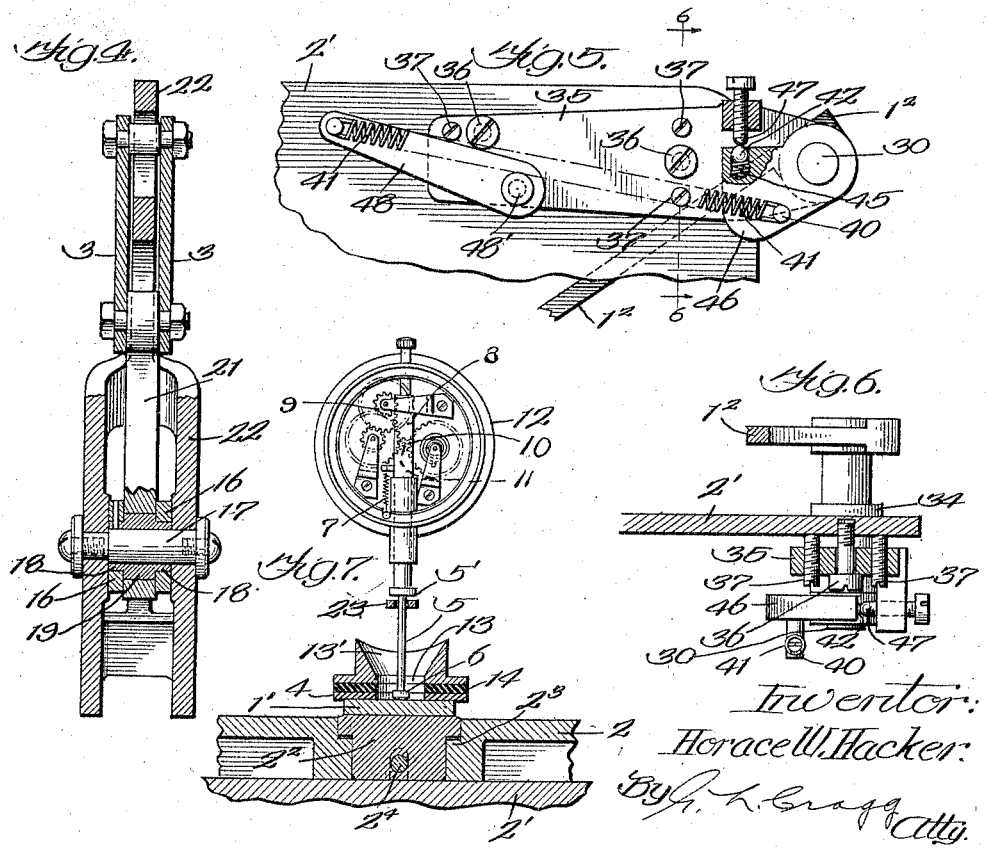

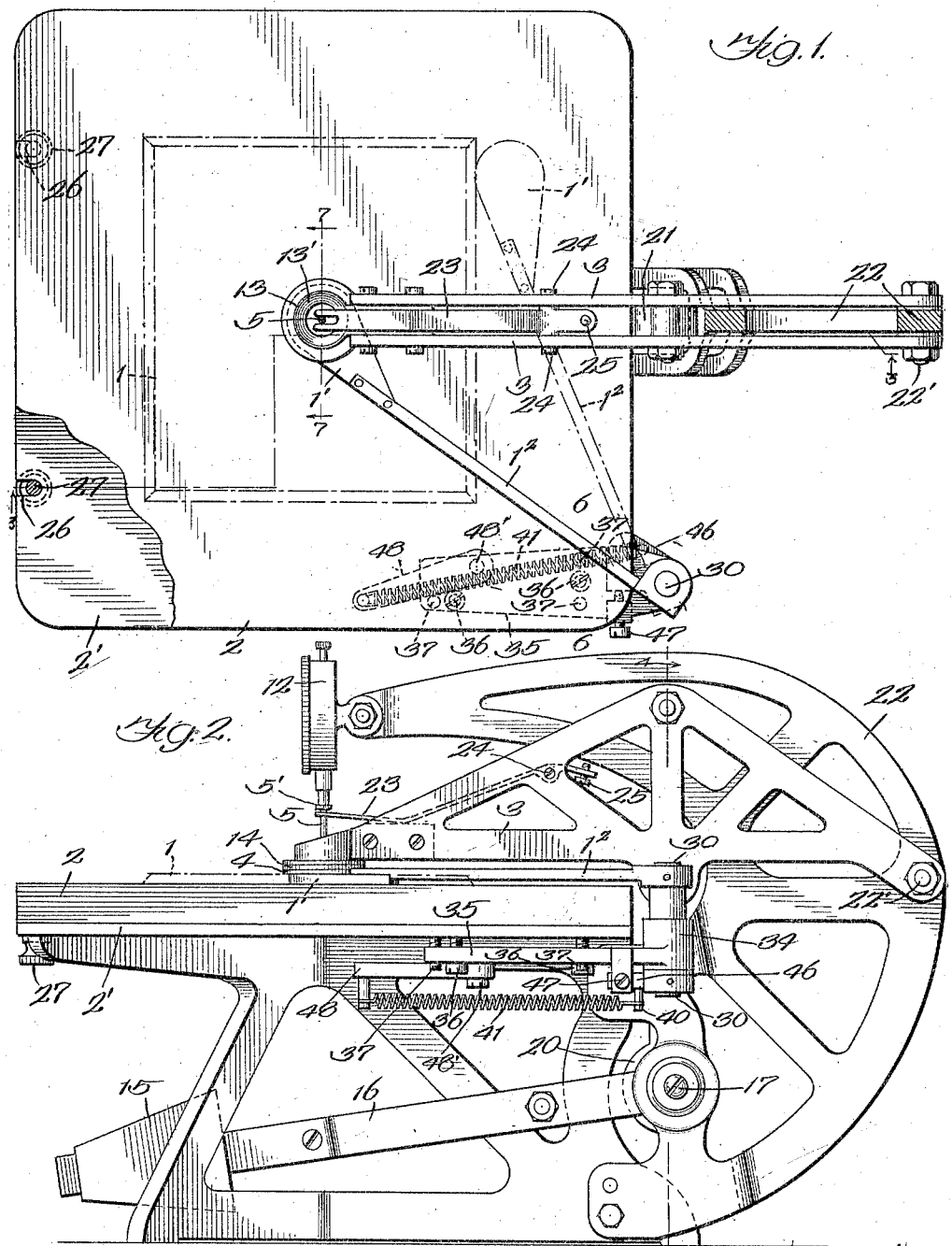

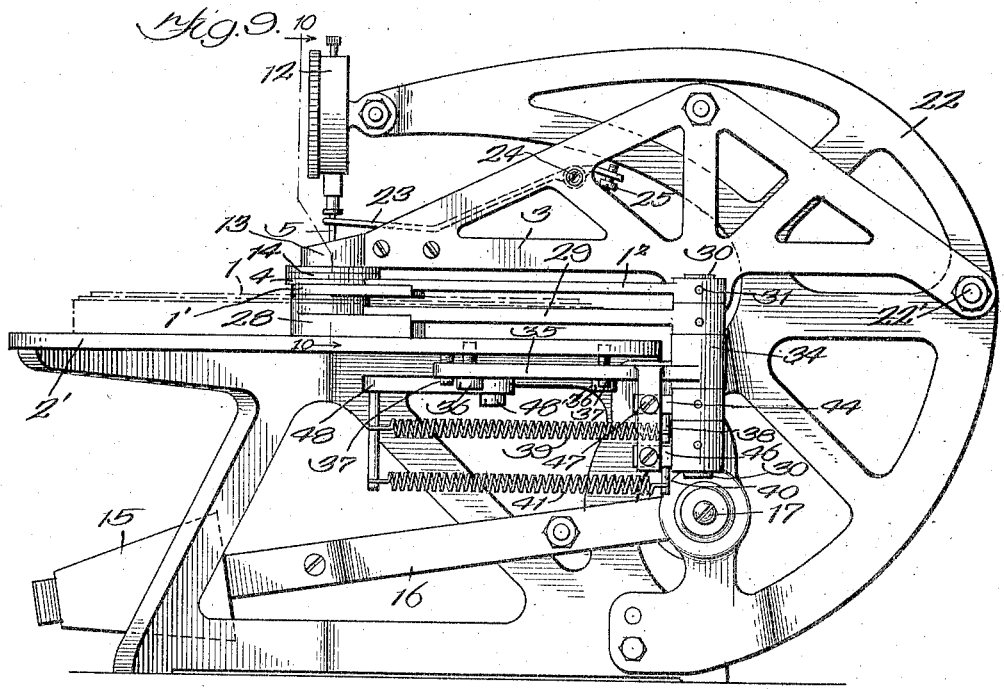
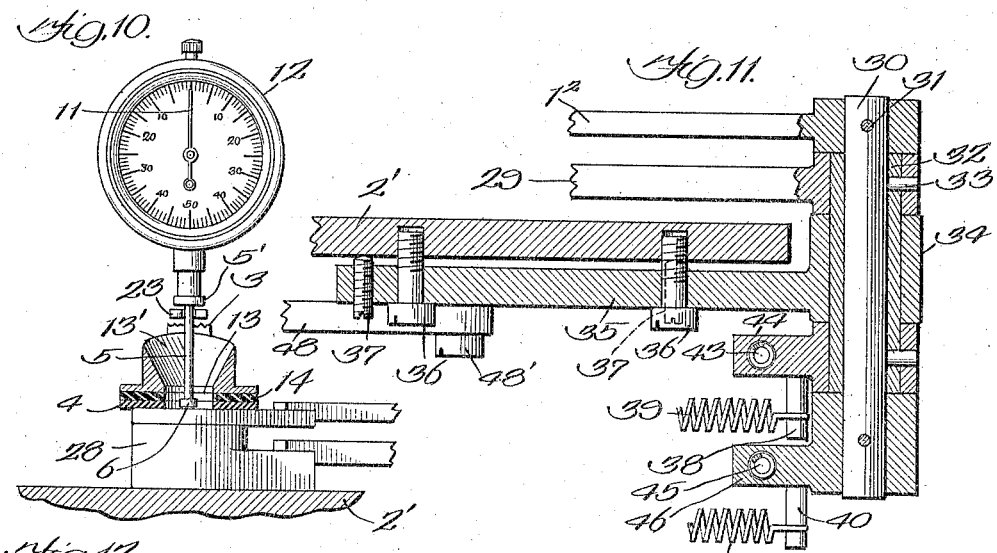
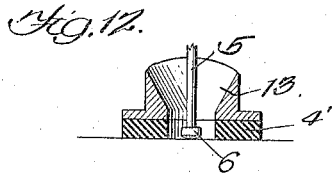

UNITED STATES PATENT OFFICE.

HORACE W. HACKER, OF CHICAGO, ILLINOIS.

MEASURING INSTRUMENT.

1,307,776. Specification of Letters Patent. Patented June 24, 1919.

Application filed June 20, 1918. Serial No. 241,082.

*To all whom it may concern:*

Be it known that I, HORACE W. HACKER, citizen of the United States, residing at Chicago, in the county of Cook and State of Illinois, have invented a certain new and useful Improvement in Measuring Instruments, of which the following is a full, clear, concise, and exact description.

My invention relates to those machines or devices for measuring the heights or thicknesses of objects as modified by heavy working pressures when such objects are absent from their normal working environment for the purpose of such measurement. Such a machine usually employs a micrometric gage and means for exerting that degree of heavy pressure upon that portion of the object being measured which such portion would receive in its actual working environment, the micrometric gage preferably having means for supplying a moving element thereof with an extremely light degree of pressure which is sufficient to maintain the gage in measuring relation to the object whose working height is being measured but which gage desirably has no material influence in causing the portion of the object being measured to assume the height which such object has in its working condition. I do not wish to limit the improvement of my invention to these characteristics. Such machines are of peculiar service in comparing the working heights of printing plates and their mountings, which heights notably vary under working conditions as compared with their heights when not under working pressure.

The object whose working height or thickness is to be determined is placed between an engaging element and a follower, the follower being preferably universally mounted or movable in order to be self-adjusting to have its engaging face in uniform contact with and perfectly parallel to the face of the object engaged by the follower in order that working-like pressure might be transmitted to the object uniformly throughout the area of contact of the follower with the object being measured. Where the follower is universally mounted or movable, I back it with a resilient cushion or make it of suitable resilient cushion material such as a sheet of rubber, the follower in either case being universally movable readily to adapt its object engaging surface to the surface of the object that is engaged thereby.

Another feature of my invention resides in the provision of one or more height gages constituting the standard or standards with which the measurements effected by the machine are to be compared. These height gages are mounted upon the machine in a manner to permit them to be moved into position beneath the follower and out of such position when the object to be measured is disposed beneath the follower. Springs are desirably employed for normally bringing the height gages beneath the follower. These springs are preferably so anchored to the frame of the machine that they may be adjusted to be ineffective whereby the height gages may be normally withdrawn from position beneath the follower.

Where the micrometric gage plunger passes through or alongside of the follower into direct contact with the object whose working height is being measured, it will project below the lower face of the follower in the absence of an object or height gage beneath the follower and therefore would constitute an obstacle in the path of the object to be measured, or the height gage, being placed beneath the follower. I provide lever or other mechanism for elevating the micrometric gage plunger, this mechanism being desirably automatically operated so that the plunger is elevated above the lower face of the follower before it is possible to insert an object or height gage beneath the follower.

In accordance with another feature of my invention the bed or support for the objects that are to be measured is higher just beneath the follower so that the remainder thereof need not be accurately machined and whereby no portion of the bed will have any influence upon the object being measured except the most accurately formed portion immediately beneath the follower, this arrangement eliminating the possibility of error due to the bed or support.

In accordance with still another feature of my invention there are two supports or beds, one movably positioned above the other. The upper support is adapted for the measurement of thinner objects and when thicker objects are to be measured this upper support is removed in order that the lower support may directly function in coöperation with the follower.

I will explain my invention more fully by reference to the accompanying drawings showing the preferred embodiment thereof and in which Figure 1 is a plan view of a structure made in accordance with the preferred embodiment of the invention, a part of the structure being broken away; Fig. 2 is a side view of the structure illustrated in Fig. 1; Fig. 3 is a sectional view on line 3—3 of Fig. 1; Fig. 4 is a sectional view, on a larger scale, on line 4—4 of Fig. 2; Fig. 5 is a view of a part of the structure taken from beneath, portions being broken away; Fig. 6 is a sectional view on line 6—6 of Fig. 5; Fig. 7 is a sectional view, on a larger scale, on line 7—7 of Fig. 1; Fig. 8 is a view from beneath of a portion of a removable part of the structure; Fig. 9 illustrates a form to which the instrument may readily be modified; Fig. 10 is a sectional view on line 10—10 of Fig. 9; Fig. 11 is a vertical sectional view taken through the axis of movement of the swinging gages and contiguous parts entering into the embodiment of the invention illustrated in Fig. 9; and Fig. 12 illustrates a modified form of follower.

Like parts are indicated by similar characters of reference throughout the different figures.

The forms of the invention illustrated in Figs. 12 and 1 to 8 inclusive will first be described.

The object 1 whose working height or thickness is to be determined is rested upon or engaged with a support or wall portion 2. A follower support 3 carries a follower or abutment 4, preferably made of metal or fiber, for engaging the top or other opposing surface of the object 1, the under and engaging face of this abutment being accurately planed to lie perfectly flat upon the top surface of the object 1. The top surface of the support 2 also presents a plane surface on which the object rests. The follower support 3 is suitably mounted so that it may be lifted for the interposition of the object 1 between the abutment 4 and support 2 and is preferably provided with means whereby the abutment 4 will be automatically engaged with the top surface of the object 1. The micrometric gage is of any suitable form, the gage illustrated, which is preferably mounted independently of the support 3, being preferred, this gage including a vertically disposed plunger 5 carrying an abutment 6 and pressed downwardly by a light spring 7. The upper portion of the plunger 5 carries a rack 8 which constitutes an actuating element of a multiplying train of gears 9, the shaft of whose final pinion 10 carries the indicating needle 11. The gage dial is carried by a ring 12 which may be turned to adjust the normal idle or initial position of the indicating needle 11 with respect to the dial.

The follower 6 may either rest upon the upper end of the follower 4, according to the form of the invention shown in Fig. 12, or it may pass through a channel 13 in the follower 4 as elsewhere illustrated so that the follower 6 may rest directly upon and be maintained in engagement with the object 1 by the light spring 7 and adjacent the follower 4 to measure the height of this object after such height has been modified by the heavy pressure exerted at 4.

In using the device it is customary to compare the heights of the objects with a standard height, to which end an object or height gage of standard height is first interposed between and simultaneously engaged with the top of the support 2 and the bottom face of the follower abutment 4 whereafter the dial ring 12 is adjusted to bring the zero mark of the dial scale into register with the indicating end of the indicator 11. After the machine has thus been adjusted the height gage $1^1$ of standard height is removed from beneath the plunger 5 and abutment 6 which are elevated to permit of the location of objects whose heights are to be compared with the standard height. This gage $1^1$ of standard height is, in accordance with another feature of my invention, permanently associated with the measuring instrument and is mounted thereon to be movable into place beneath or away from the plunger 5. The support upon which the gage is directly carried is the swinging arm $1^2$ so pivoted that the gage is readily brought to accurate position and readily withdrawn from such position as desired. This arm is associated with other mechanism that enters into its control as will later be set forth.

Owing to the light spring 7 the follower 6 will maintain engagement with the object whose working height is being tested, the extent of the departure of the object from the standard height being indicated by the departure of the needle 11 from its zero or normal position. The scale divisions desirably represent each a thousandth of an inch, the multiplying gearing between the rack bar 8 and the indicator 11 permitting of the large scale subdivisions indicated. For example, if the object whose height or thickness is being measured should lack five one thousandths of an inch of the standard height, the indicating needle 11 will come to rest five scale divisions in a counter-clockwise direction from normal. If the height or thickness of the object being measured should exceed the standard height say ten one thousandths of an inch, the indicating needle 11 will come to rest ten scale divisions in a clockwise direction from normal. It is desirable to maintain the lower surface of the follower 4 in parallelism with the portion of the top surface of the object 1 engaged thereby. This result may be accomplished by joining the follower 4 with its support 3 by means of a universal joint 14 which, in accordance with my invention, is in the nature of a resilient cushion that forms a spring backing for the follower that tends to hold the follower parallel with the top of the object support 2 but permits the follower to tilt slightly to adapt itself to the top surface of the object being measured in case this top surface is not absolutely parallel with the top surface of the object support. This cushion 14 is secured to the bottom of the front end of the follower carrier 3 and where the plunger 5 of the micrometric gage is to have direct contact with the object being measured, the cushion and follower are provided with holes 13 alined with the hole 13¹ in the front end of the follower carrier through which the plunger passes normally into engagement with the gage 1¹ or into engagement with the object being measured that replaces the gage 1¹. In the form of the invention illustrated in Fig. 12 the cushion 14 and the follower 4 are merged into a single body 4¹ of resilient cushion material which is sufficiently hard, particularly at its bottom face, also to act as a follower to perform the function of the element 4 of the construction shown in Figs. 7 and 10. In either case there is provided a follower structure that includes a cushion which bears a face for engaging a side of the object and which cushion makes the follower structure universally movable. In Fig. 12 the abutment 6 at the bottom of the plunger 5, instead of being projected into the object receiving space by the spring 7 when such space is empty, rests upon the top of the follower 4¹ and therefore does not enter the object receiving space. The inequalities in the height of the object being measured are determined by successively interposing the different to-be-measured portions of the object between the abutment 4 and the support 2.

In the case of a machine constructed and adjusted to measure objects that are substantially of a uniform height, such as printing plates, the bottom face of the follower will be approximately parallel with the top face of the support for the object when the follower is in object engaging position. The bottom face of the follower, because of the resilient cushion entering into its construction, will readily conform to the top surface of the object if this top surface is not absolutely parallel with the top surface of the object support, the attendant angular shifting of the follower being, as a rule, very slight since the top faces of the objects are generally very nearly parallel with the bottom faces thereof. Where the follower is mounted in place by means of an ordinary universal joint the bottom face of the follower is apt to be tilted or slanted to a material extent with respect to the top of the object support and consequently with respect to the top surface of the object being engaged, requiring material movement of the follower in being brought to proper position with respect to the object. When the angularity of the follower with respect to the object is very marked the follower is apt to mar the object in being brought to right position with respect thereto. Where my construction is employed there need be no marked angularity between the follower and the object and no consequent marring of the object in the adaptation of the follower thereto.

I have thus far described an element 2 (which constitutes a support when it is placed horizontal and which is in effect a wall portion against which the object whose height or thickness is to be measured is placed) a follower 4 and a micrometric gage having a portion 6 in engagement with the follower or the object being measured. I have illustrated and thus far specifically described a device for measuring the thickness or height of plates or other objects having approximately flat faces, though it is obvious that objects having engaging surfaces of other form may be measured by devices embracing my invention.

The device of my invention is particularly well adapted to the measurement of the heights of printing plates and their mountings singly or combined whether used in flat bed or other types of presses and when the device is adapted to such or similar purposes the follower 4 is desirably applied to the object being measured with a heavy pressure preferably substantially equal to the pressure to which such object is subject by an equivalent area of a coöperating part in the normal working environment of such object, whereby the height or thickness of the object at various portions of the object is taken as such height is modified by the working pressure to which such object is subject. To this end means are supplied, in addition to the micrometric gage, for furnishing the desired degree of heavy pressure with which the follower 4 engages the object 1. As the invention is embodied in the form shown in the drawings the means for furnishing the desired degree of heavy pressure is in the form of a weight 15 (furnishing pressure comparatively very heavy with respect to the pressure furnished by the light spring 7) upon the free end of a crank arm 16 concentrically mounted upon the stationary shaft 17. A weight is preferred for furnishing the heavy pressure since such pressure is uniform. The crank arm 16 is in fixed relation with a rotatable sleeve 18 having a bore co-axial with the shaft 17. The intermediate portion 19 of the sleeve 18 is enlarged and has its circular periphery eccentric with respect to the shaft 17, this eccentric being thus in fixed angular relation to the crank arm 16. The eccentric 19 is surrounded by an eccentric strap 20 at the lower end of a pitman 21 whose upper end is connected with an intermediate portion of the support 3 that is pivotally mounted upon the mounting bracket 22 at $22^1$, this mounting bracket also carrying a micrometric gage at its forward upper end. When the crank arm 16 is raised the eccentric will be shifted to raise the support 3 and when the crank arm 16 is lowered the support 3 will be consequently lowered through the intermediation of the eccentric. The weight 15, through the intermediation of the arm 16, the pitman 21 and the support 3, presses the follower 4 with the desired degree of heavy pressure upon the object 1 being measured, whereby the particular portion of the object being measured is brought to the thickness or height it will assume in its working relation. Each time a new measurement is taken the forward end of the crank arm is lifted to permit of the desired positioning of the object or the portion of the object to be measured whereafter the arm 16 is gently lowered until the follower 4 rests upon the object 1 whereupon the arm 16 is released to permit the weight 15 to force the follower 4 upon the object 1 with the requisite pressure, the element 6 of the micrometric gage following the movement of the top surface of the object being measured to bring the indicating needle 11 to the height indicating position. It is necessary to lift the arm 16 each time the object is to be repositioned or replaced since the pressure is so heavy as to prevent the object from being moved without injury to it when the weight 15 is performing its function.

While the spring 7 exerts a slight downward pressure upon the follower 4 or object 1 it is apparent that such pressure is ineffective for the purpose of my invention, pressure being required which is comparatively very heavy in its relation to the pressure furnished by said spring. For example, in the machine illustrated the heavy pressure furnished by the weight 15 is one hundred pounds whereas the pressure furnished by the minute spring 7 would not exceed an ounce. By having the follower 6 rest directly upon the object that is being measured no accuracy of construction is required in the upper part of the follower 4.

Where the follower 4 is apertured or otherwise formed to permit the plunger of the micrometric gage to pass therethrough or along side of the same it is apparent that this plunger will be projected below the bottom surface of the follower when neither the gage $1^1$ nor the object to be measured is below the follower and that this plunger would interfere, unless lifted, with the insertion of the gage $1^1$ or an object, that is to be measured beneath the follower when the follower is lifted for this purpose. I provide lever mechanism for elevating the plunger of the micrometric gage to avoid this difficulty. In the preferred embodiment of the invention this lever mechanism is operated automatically during the lifting of the follower and after the follower has been partially elevated on which account the plunger lifting lever 23 is fulcrumed at 24 upon the stationary bracket or support 22, the fulcrum 24 being between the ends of the lever 23. The tail of the lever 23 carries an adjustable abutment 25 that bears against a part of the stationary bracket 22. The front end of the lever 23 is bifurcated to straddle the plunger beneath the plunger head $5^1$. Normally the abutment 25 is out of contact with the bracket 22 and the forked end of the lever 23 is normally out of contact with the plunger head $5^1$. When the weight 15 is raised the follower carrying end of the follower support 3 will rise to bring the abutment 25 into engagement with the bracket 22 to effect movement of the forked end of the lever 23 into engagement with the plunger head $5^1$ to elevate the plunger as the lifting movement of the follower continues until finally the lower end of the plunger is brought above the lower face of the follower 4 to be out of the path of the height gage or object being inserted beneath the follower.

When the objects to be measured, such as printing plates, cover considerable area, they are shifted about beneath the follower 4 to determine the working height at different parts of the objects. I make the object supporting portion that underlies the follower 4 near the plane of the follower or higher than the remainder of the object support in order that this part of the support 2 need alone be accurately planed or surfaced. Any irregularities in the remainder of the support 2 will have no influence upon the object being measured. In the preferred embodiment of the invention the object support 2 is rested upon a bed $2^1$, the central portion of the top of which is carefully planed or shaped to be in parallelism with the follower 4. The portion $2^2$ of the support 2 is loosely held in assembly with the support 2 by a part $2^3$ interposed between the head of the support part $2^2$ and the pin $2^4$ carried by said support part. The top and bottom faces of the support part $2^2$ are in perfect parallelism. This support part $2^2$ is made sufficiently high to have its bottom face rest upon the accurately formed central part of the bed $2^1$ (which central part is generally about two one-thousandths of an inch above the remainder of the top surface of the bed $2^1$), the supporting part $2^2$ being sufficiently high to cause it to project above the support 2. By this arrangement the supporting element 2 need not itself be accurately machined except the part $2^2$ thereof.

The top surface of the portion $2^2$ is high enough to receive the unmounted printing plate 1 which is the object to be measured that is illustrated in Figs. 1, 2 and 3. In order that the working heights of the mounted printing plates may be measured the object support 2 is removable and the level of the top face of the bed or support $2^1$ is such as to permit the mounted plate to be properly positioned on the bed beneath the follower. The bed may be provided with two notches 26 to receive the stems of thumb screws 27 that are carried by the support 2. By tightening these screws the bed $2^1$ and the support 2 are tightly assembled and by loosening these screws the support 2 may be removed for the purpose stated. In the absence of the support 2 a second height gage 28 is employed to coöperate with the height gage $1^1$ to position the plunger 5 of the micrometric gage in adjusting the indicating needle of this gage to zero. This second height gage is mounted similarly to the height gage $1^1$ as clearly illustrated in Figs. 9, 10 and 11 that show the instrument of my invention modified to determine the working heights of mounted printing plates, the support 2 being omitted.

The height gage 28 is supported upon an arm 29. The gage arms $1^2$ and 29 have a common axis of movement. The gage arm $1^2$ is fixed upon a shaft 30 by a pin 31. The gage arm 29 is fixed to a sleeve 32 by a pin 33, this sleeve being journaled upon the shaft 30. The sleeve 32 is journaled in the sleeve bearing 34 forming a part of a bracket structure whose base 35 is secured to and beneath the bed $2^1$ by means of screws 36. The level of the bracket base 35 determines the plane in which the height gages are disposed, on which account I provide three leveling screws 37 in the bracket base 35. By adjusting these leveling screws the plane of the bracket base 35 may readily be adjusted to adjust the planes of the height gages. The sleeve 32 carries an arm 38 to which a spring 39 is secured for the purpose of normally holding the height gage 28 in place beneath the follower 4. The shaft 30 carries an arm 40 to which the spring 41 is secured also for the purpose of normally holding the height gage $1^1$ in place beneath the follower 4. A buffer spring is employed in conjunction with each spring to prevent it from acting too violently. These buffer structures are similar, an outwardly spring pressed abutment ball 42 (Fig. 6) moving bodily with the height gage supporting arm that is provided therewith. A ball receiving socket 43 is formed in the arm 44 that is in fixed connection with the sleeve 32. A ball receiving socket 45 is formed in the arm 46 that is in fixed connection with the shaft 30. The ball in each socket faces an abutment, one such abutment being indicated at 47 in Fig. 5. These abutments are desirably in the form of adjustable screws carried by the bracket base 35. Each spring is desirably connected at one end with the bed or support $2^1$ through the intermediation of an arm, one such arm being illustrated at 48 in Fig. 5. The spring that is connected with this arm normally holds the arm against an adjacent screw 36 that acts as a stop, the axis of the spring being between the pivot $48^1$ and the stop. When the height gage is to be thrown out of service the arm 48 is moved to bring the spring upon the other side of the arm pivot $48^1$ whereby the influence of the spring upon the arm that carries the height gage is removed to permit the height gage to remain in any position in which it is put. This permits the height gage to be placed out of the way during the time that the various portions of an object being measured are being shifted about beneath the follower 4.

In the claims I use the term "working-like pressure" meaning thereby a pressure which will so modify the height or thickness of the object being measured that the measurement will indicate such thickness of the object when under working pressure in its working environment.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A machine for measuring the working thickness of objects subject to heavy working pressure including an element for engaging one side of an object that is to be measured; a follower structure including a cushion that bears a face for engaging an opposite side of the object and which cushion makes the follower structure universally movable; means for applying heavy working-like pressure to the object through the intermediation of said follower structure and object engaging element; and a micrometric gage having an actuating element provided with means for causing it to move toward the object as the object is depressed to measure the working height of the object.

2. A machine for measuring the working thickness of objects subject to heavy working pressure including an element for engaging one side of an object that is to be measured; a follower structure including a cushion that bears a face for engaging an opposite side of the object and which cushion makes the follower structure universally movable; means for applying heavy working-like pressure to the object through the intermediation of said follower structure and object engaging element; and a measuring device having a measuring element influenced by the object as it is depressed.

3. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a micrometric gage having an actuating element engageable with the side of the object that is engaged by the follower and movable with respect to the follower to project within the object receiving space; and a lever for moving said actuating element from the object receiving space.

4. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a micrometric gage having a plunger free to project into the object receiving space, and means for moving the plunger into engagement with the object in the object receiving space; and a lever for withdrawing said plunger from the object receiving space.

5. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; lever mechanism for moving the follower from the object engaging element for the insertion and removal of objects; a micrometric gage having an actuating element engageable with the side of the object that is engaged by the follower and movable with respect to the follower to project within the object receiving space; and a lever operated by the aforesaid lever mechanism and operating to move said actuating element from the object receiving space as the follower is moved from said object engaging element.

6. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; lever mechanism for moving the follower from the object engaging element for the insertion and removal of objects; a micrometric gage having a plunger free to project into the object receiving space, and means for moving the plunger into engagement with the object in the object receiving space; and a lever operated by the aforesaid lever mechanism and operating to move said plunger from the object receiving space as the follower is moved from said object engaging element.

7. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; lever mechanism for moving the follower from the object engaging element for the insertion and removal of objects; a micrometric gage having an actuating element engageable with the side of the object that is engaged by the follower; and a lever operated by the aforesaid lever mechanism and operating to move said actuating element from the object receiving space as the follower is moved from said object engaging element.

8. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; lever mechanism for moving the follower from the object engaging element for the insertion and removal of objects; a micrometric gage having a plunger and means for moving the plunger into engagement with the object in the object receiving space; and a lever operated by the aforesaid lever mechanism and operating to move said plunger from the object receiving space as the follower is moved from said object engaging element.

9. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; mechanism for moving the follower from the object engaging element for the insertion and removal of objects; and a micrometric gage having an actuating element engageable with the side of the object that is engaged by the follower, said actuating element being movable away from the object engaging element by the mechanism that moves the follower away from the object engaging element.

10. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; mechanism for moving the follower from the object engaging element for the insertion and removal of objects; and a micrometric gage having a plunger and means for moving the plunger into engagement with the object in the object receiving space, said plunger being movable away from the object engaging element by the mechanism that moves the follower away from the object engaging element.

11. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; and a height gage having a mounting upon the machine whereby this height gage is movable into and out of the space between the follower and object engaging element.

12. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; and two height gages having mountings upon the machine whereby the height gages are independently movable into and out of the space between the follower and object engaging element, these mountings permitting one height gage to be superimposed upon the other.

13. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a height gage; and an arm carrying the height gage and swingingly mounted upon the machine, the arm, in its swinging movement, bringing the height gage into or out of the space between the follower and the object engaging element.

14. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; two height gages; and two independently movable arms swingingly mounted upon the machine and each carrying a height gage, each arm in its swinging movement, bringing the height gage carried thereby into and out of the space between the follower and the object engaging element, these arms permitting one height gage to be superimposed upon the other.

15. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a height gage having a mounting upon the machine whereby this height gage is movable into and out of the space between the follower and object engaging element; and a spring for normally positioning the height gage between the follower and object engaging element.

16. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a height gage; an arm carrying the height gage and swingingly mounted upon the machine, the arm, in its swinging movement, bringing the height gage into or out of the space between the follower and the object engaging element; and a spring for normally positioning the height gage between the follower and object engaging element.

17. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a height gage having a mounting upon the machine whereby this height gage is movable into and out of the space between the follower and object engaging element; a spring for normally positioning the height gage between the follower and object engaging element; and a swinging arm by means of which one end of the spring is attached to the machine, this arm in one of its positions placing the spring under operative tension and in an alternative position relieving the spring of this tension.

18. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a height gage; an arm carrying the height gage and swingingly mounted upon the machine, the arm, in its swinging movement, bringing the height gage into or out of the space between the follower and the object engaging element; a spring for normally positioning the height gage between the follower and object engaging element; and a swinging arm by means of which one end of the spring is attached to the machine, this arm in one of its positions placing the spring under operative tension and in an alternative position relieving the spring of its tension.

19. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a height gage having a mounting upon the machine whereby this height gage is movable into and out of the space between the follower and object engaging element; a spring for normally positioning the height gage between the follower and object engaging element; and a spring abutment for yieldingly limiting the motion of the height gage which is effected by said spring.

20. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; a height gage; an arm carrying the height gage and swingingly mounted upon the machine, the arm, in its swinging movement, bringing the height gage into or out of the space between the follower and the object engaging element; a spring for normally positioning the height gage between the follower and object engaging element; and a spring abutment for yieldingly limiting the motion of the height gage which is effected by said spring.

21. A machine for measuring the working thickness of objects subject to heavy working pressure including a follower for engaging one side of the object that is to be measured; two object supports, one being between the follower and the other object support and being movable from the space between this latter object support and the follower; and means for applying heavy working-like pressure to the object through the intermediation of said follower and object engaging element.

22. A machine for measuring the working thickness of objects subject to heavy working pressure including a support for engaging one side of an object that is to be measured, the portion of the support opposite the follower being nearer the plane of the follower than surrounding portions of the support; a follower for engaging an opposite side of the object; means for applying heavy working-like pressure to the object through the intermediation of said follower and object engaging support, said portion of said support being loose with respect to the balance of this support; and a second support for positioning the loose portion of the aforesaid support.

In witness whereof I hereunto subscribe my name this 29th day of May, A. D., 1918.

HORACE W. HACKER.

Copies of this patent may be obtained for five cents each, by addressing the "Commissioner of Patents, Washington, D. C."